US007793310B2

(12) United States Patent
Celi, Jr. et al.

(10) Patent No.: US 7,793,310 B2
(45) Date of Patent: Sep. 7, 2010

(54) DYNAMICALLY INSERTING PROXIES INTO JAVA ENVIRONMENTS WITHOUT CODING EXPLICIT PROXY HOOKS INTO JAVA APPLICATIONS

(75) Inventors: Joseph Celi, Jr., Boca Raton, FL (US); Miriam M. Celi, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1060 days.

(21) Appl. No.: 11/456,612

(22) Filed: Jul. 11, 2006

(65) Prior Publication Data

US 2008/0040731 A1 Feb. 14, 2008

(51) Int. Cl.
  *G06F 3/00* (2006.01)
  *G06F 9/44* (2006.01)
  *G06F 9/46* (2006.01)
  *G06F 13/00* (2006.01)
(52) U.S. Cl. .................................................... 719/332
(58) Field of Classification Search .................. 719/332
  See application file for complete search history.

(56) References Cited

U.S. PATENT DOCUMENTS

| | | | |
|---|---|---|---|
| 6,349,343 B1 | 2/2002 | Foody et al. | |
| 6,701,374 B2 | 3/2004 | Gupta et al. | |
| 6,877,163 B1 * | 4/2005 | Jones et al. | 719/332 |
| 2003/0105882 A1 | 6/2003 | Ali et al. | |
| 2005/0021762 A1 | 1/2005 | Gbadegesin | |
| 2005/0283517 A1 | 12/2005 | Meduri et al. | |

OTHER PUBLICATIONS

Ira R. Forman et al, "Java Reflection in Action: Using Java's Dynamic Proxy", 2004, pp. 1-16.*
Brian Goetz, "Java theory and practice: Decorating with dynamic proxies", Aug. 30, 2005, pp. 1-8.*
Lara D'Abreo, "Java Dynamic Proxies: One step from Aspect-oriented Programming", Oct. 14, 2004, pp. 1-7.*
Robert Simmons Jr., "Hardcore Java", 2004, Chapter 10, pp. 1-15.*
Sun, "Dynamic Proxy Classes", 1999, Sun Microsystems, pp. 1-9.*

* cited by examiner

*Primary Examiner*—Li B Zhen
*Assistant Examiner*—Timothy A Mudrick
(74) *Attorney, Agent, or Firm*—Patents On Demand, P.A.; Brian K. Buchheit

(57) ABSTRACT

A method for inserting a proxy into a JAVA application environment that begins with the activation of a program launcher. The program launcher instantiates a proxy and passes the prosy to an interface manager. Then the program launcher starts an instance of a JAVA application. The interface manager then initiates an instance of the interface and hooks the proxy between the interface instance and the JAVA application instance.

20 Claims, 4 Drawing Sheets

DYNAMICALLY INSERTING PROXIES INTO JAVA ENVIRONMENTS WITHOUT CODING EXPLICIT PROXY HOOKS INTO JAVA APPLICATIONS

BACKGROUND

1. Field of the Invention

The present invention relates to the field of software proxies and, more particularly, to dynamically inserting proxies into JAVA environments without coding explicit proxy hooks into JAVA applications.

2. Description of the Related Art

In computer science, a proxy can be a software agent or program that performs a function on behalf of another application or system while hiding the underlying details. A proxy can be a communication intermediary injected in a communication pathway involving at least two software/hardware/firmware components, which would otherwise directly communicate with each other. A proxy can be used to insert additional programmatic instructions, routines, decision points, logic flows, and the like within an existing communication flow.

For example, a common use of a proxy is as a software firewall established at an access junction of a network. In the example, the proxy can replace an IP address of a host on an internal or protected network with its own IP address for all traffic passing through it. The proxy can include authentication logic capable of making decisions as to whether or not a user or client IP address is permitted to use the proxy. The proxy can further block potentially hostile incoming traffic from entering a protected network. For instance, the proxy can block excessive communication requests or other potential network overloading behavior that is characteristic of a denial of service attack.

Proxy use is not restricted to network protection situations, however, but can be considered general-purpose software constructs that can be utilized in any of a variety of circumstances. That is, proxies can be used to add new or alternate functionality to an existing software system without modifying the system's existing code. One common use of proxies is to monitor program flow and parameter values, such as during software testing and/or maintenance. Proxies can also be used to collect performance data, processing metrics, and the like, for network planning and dynamic management purposes. For example, an autonomic computing environment can use one or more proxies to detect failures, bottlenecks, or other potential system problems and dynamically route traffic to functional backup nodes.

Currently, JAVA implementations based upon Software Design Kit (SDK) version 1.3 and later utilize the "java.lang.reflect" package that introduces a Proxy Class to the JAVA programming language. A constructor for the Proxy Class is "Proxy(InvocationHandler h)". This constructor creates a new proxy instance from a subclass with the specified value for an invocation handler. The invocation handler calls an invoke method, "invoke(Object, Method, Object[ ])", for each method invoke on the proxy object. In the invoke method, the first parameter is the proxy object, the second parameter is the method object representing the method from the interface implemented by the proxy, and the third parameter is the array of parameters passed to the interface method.

A shortcoming of the present implementation of the JAVA Proxy Class is that using the built-in JAVA support, the proxy does not have access to an original interface to which it is hooking unless such access is provided by an application to which the proxy is being hooked. Thus, the currently available built-in proxy support does not afford a means to insert an interface proxy into an existing application without modifying the application. That is, the entire program to which a proxy is to be hooked needs to be rewritten and recompiled in order to accommodate the proxy. This need for application redevelopment and, potentially, redistribution makes using the JAVA Proxy Class to insert an interface proxy in an existing JAVA application an unattractive option.

Further, a JAVA proxy object is not allowed to access the methods the interlace freely. The interface must be explicitly coded to include access for the proxy. In addition to the need for explicit method access, a JAVA proxy object is restricted to the execution of a single method.

SUMMARY OF THE INVENTION

The present invention discloses a solution for inserting a proxy between a JAVA application and an interface. The invention permits a proxy to be dynamically injected into an existing JAVA application without recompiling the JAVA application or modifying the existing application in any way. The present invention overcomes the very tight coupling that currently exists between JAVA applications and the class libraries used by these applications by transparently and dynamically inserting a new layer of code, which binds the proxy to the JAVA application.

More specifically, the present invention uses an inventive program launcher to instantiate a proxy and inserts the proxy into a proxy interface of an interface manager. The program launcher then launches a JAVA application, which obtains the proxy interface from the interface manager, thereby binding the proxy to the JAVA application.

The present invention can be implemented in accordance with numerous aspects consistent with material presented herein. For example, one aspect of the present invention can include a method for inserting a proxy into a JAVA application environment that begins with the activation of a program launcher. The program launcher instantiates a proxy and passes the proxy to an interface manager. Then the program launcher starts an instance of a JAVA application. The interface manager then initiates an instance of the interface and hooks the proxy between the interface instance and the JAVA application instance.

Another aspect of the present invention can include a system for inserting a proxy into a JAVA application environment. This system can include a program launcher that is capable of instantiating a proxy, a JAVA application containing an interface, and an interface manager. The interface manager can manage the communications between the interface and the proxy.

It should be noted that various aspects of the invention can be implemented as a program for controlling computing equipment to implement the functions described herein, or a program for enabling computing equipment to perform processes corresponding to the steps disclosed herein. This program may be provided by storing the program in a machine readable storage, which includes a magnetic disk, an optical disk, a semiconductor memory, and any other tangible recording medium. Programs can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
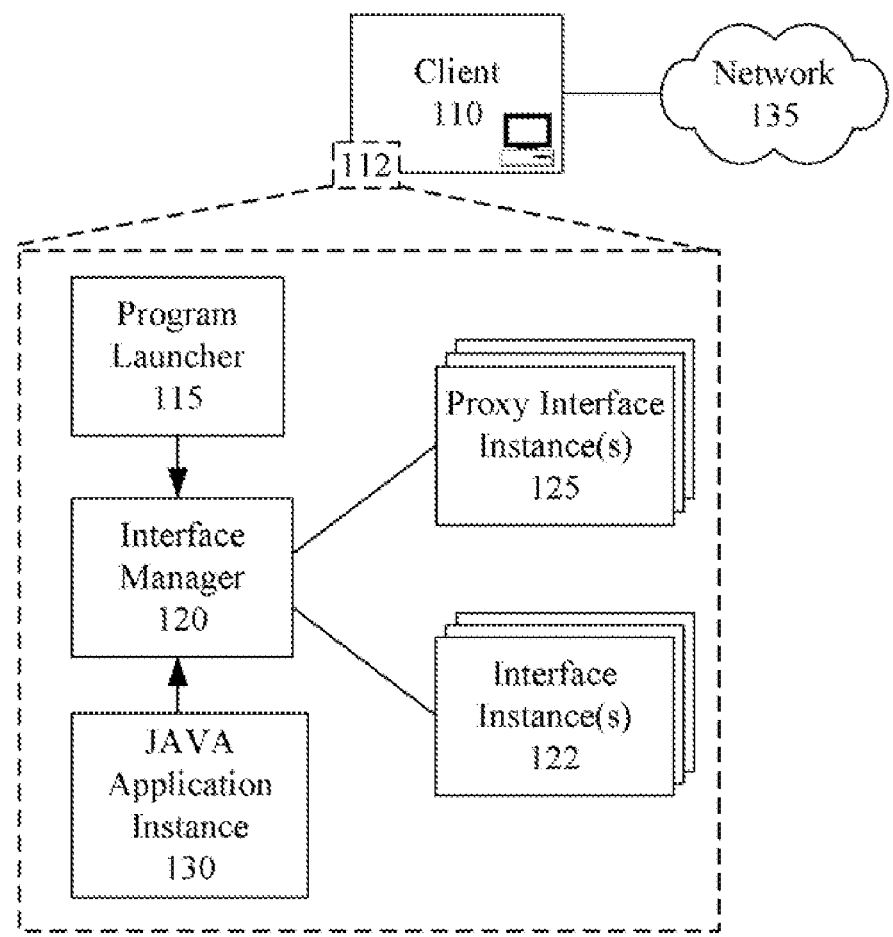
FIG. 1 is a schematic diagram illustrating a system for inserting a proxy into a JAVA application environment in accordance with embodiments of the inventive arrangements disclosed herein.

FIG. 1 is a schematic diagram illustrating a system 100 for inserting a proxy into a JAVA application environment 112 in accordance with embodiments of the inventive arrangements disclosed herein. In system 100, a client 110 connected to network 135 can execute application code written for JAVA application environment 112. The Java application environment 112 permits a proxy to be injected between an existing JAVA application and an existing JAVA interface implementation, without a need to recompile or change the existing JAVA application in any way. The JAVA application environment 112 can include a program launcher 115, an interface manager 120, and a JAVA application instance 130.

The program launcher 115 can instantiate one or more proxy instances 125 for the interface and can pass control of the proxy interface instances 125 to the interface manager 120. The program launcher 115 can provide the interface manager 120 with the proxy instances 125 before instances 130 of JAVA application are launched by program launcher 115. The JAVA application instance 130 is not necessarily aware that it was run from the program launcher 115.

The JAVA application instance 130 can obtain a new interface instance 122 from the interface manager 120. The interface manager 120 can hook the interface instances 122 to the proxy interface instances 125 so that communications between the JAVA application instance 130 and the interface instance(s) 122 occur through the proxy interface instances) 125. Since each interface instance 122 managed by the interface manager 120 can have a corresponding proxy interface instance 125, the interface manager 120 can be tasked with managing corresponding pairs of instance 122 and instance 125. Multiple pairs can exist for each JAVA application instance 130.

Program launcher 115 can include a set of machine-readable instructions capable of instantiating a JAVA application (130), and a proxy (125). Program launcher 115 can be any of a variety of software application types including, but not limited to, a thin client, a client application, a local stand-alone application, a web-based application, an applet, and the like.

Interface manager 120 can include a set of machine-readable instructions capable of instantiating an interface (122). Further, interface manager 120 manages the communications between interface instance(s) 122 and proxy instance(s) 125. Interface manager 120 can be any of a variety of software application types including, but not limited to, a thin client, a client application, a local stand-alone application, a web-based application, an applet, and the like.

Each proxy interface instance 125 can include a set of machine-readable instructions configured to add new functionality to the JAVA application instance 130 and/or to replace existing functionality of JAVA application instance 130 without changing code of the underlying JAVA application. Each proxy interface instance 125 can include machine-readable instructions to perform additional programmatic actions upon the data it receives from an associated interface instance 122 or JAVA application instance 130. For example, a value returned to proxy interface instance 125 from interface manager 120 for the interface instance 122 could indicate that the interface instance 122 is in an unavailable state. Proxy interface instance 125 can then execute instructions that request interface manager 120 to reinitialize interface instance 122.

Additionally, the proxy interface instance 125 can include functionality for capturing data passed between a corresponding interface instance 122 and the JAVA application instance 130. This data can represent actual parameter values as well as processing or performance metrics. Further, the proxy interface instance 125 can include instructions that supplement or override the current functionality of interface instance 122 and/or JAVA application instance 130.

JAVA application instance 130 can be an instance of any type of software application written in a JAVA programming language, compiled, and interpreted for a platform of client 110. Client 110 can be any of a variety of computing devices including, but not limited to, a personal computer, a kiosk, a personal data assistant (PDA), a mobile phone, and the like.

Network 130 can include any hardware/software/and firmware necessary to convey data encoded within carrier waves. Data can be contained within analog or digital signals and conveyed though data or voice channels. Network 130 can include local components and data pathways necessary for communications to be exchanged among computing device components and between integrated device components and peripheral devices. Network 130 can also include network equipment, such as routers, data lines, hubs, and intermediary servers which together form a data network, such as the Internet. Network 130 can also include circuit-based communication components and mobile communication components, such as telephony switches, modems, cellular communication towers, and the like. Network 130 can include line based and/or wireless communication path ways.

Although the Java application environment 112 is shown as a standalone environment of client 110, system 100 is not to be construed as limited in this regard. In another contemplated embodiment (not shown), system 100 can execute in a distributed fashion over network 135. In such an embodiment, it is possible for any, all, or a variety of combinations of program launcher 115, interface manager 120, proxy interface instance(s) 125, interface instance(s) 122, and JAVA application instance 130 to run on other components of network 135. Each of these components can be redundantly implemented in a clustered arrangement and/or in a resilient computing environment. Each component can also be a virtual component implemented within virtual machines and/or within virtual computing environments.

Figure 2:
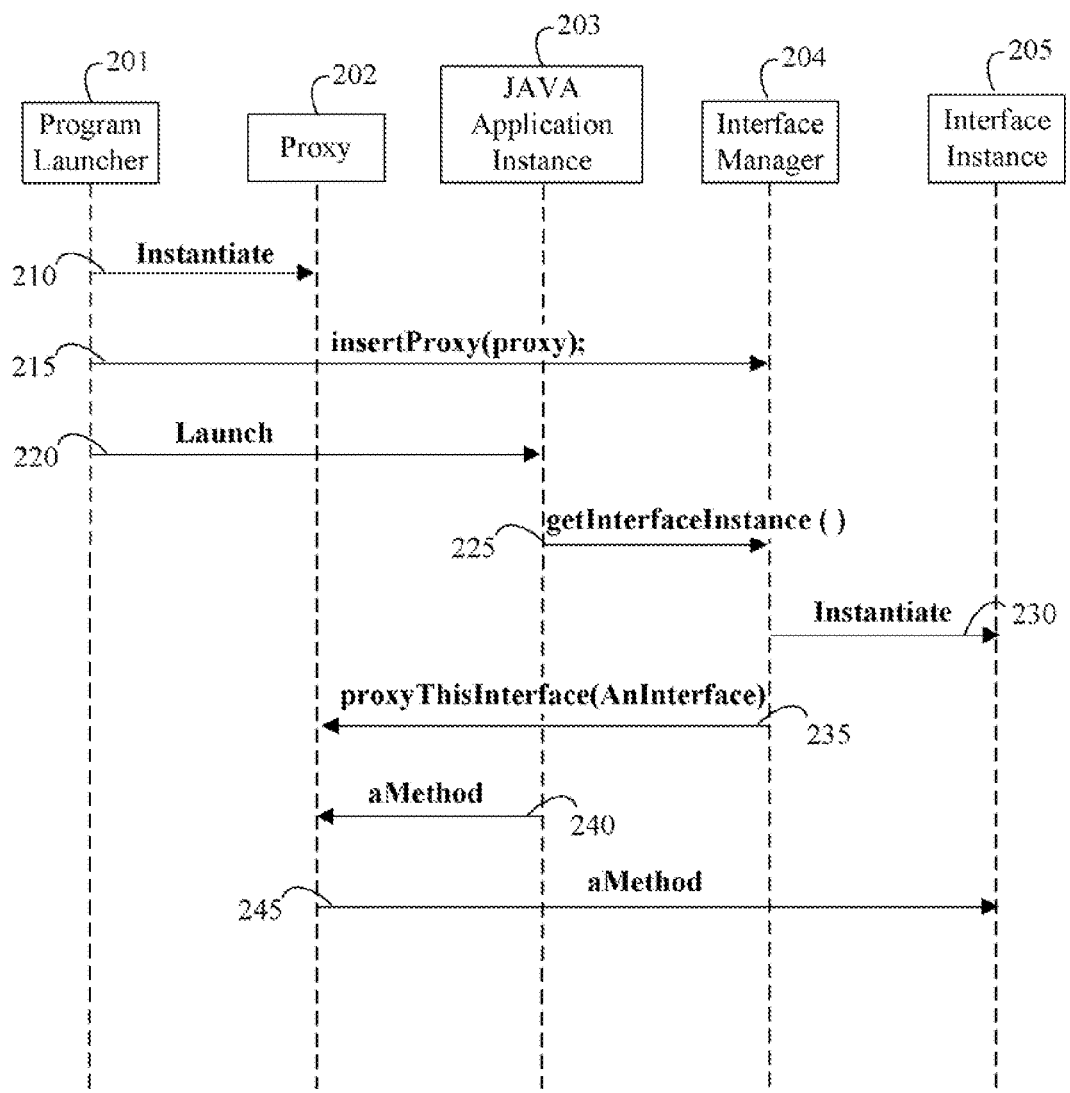
FIG. 2 is an illustration of sequential communications in accordance with an embodiment of the inventive arrangements disclosed herein.

FIG. 2 is an illustration 200 of sequential communications in accordance with an embodiment of the inventive arrangements disclosed herein. Illustration 200 can be performed in the context of system 100. The example of illustration 200 is not limited in this regard, however, and can be performed in the context of any system supporting dynamic insertion of proxies into an existing JAVA application.

Illustration 200 describes sequential communications between program launcher 201, proxy 202, JAVA application 203, interface manager 204, and interface instance 205. Communication 210 is the first communication in the sequence. Program launcher 201 uses communication 210 to instantiate proxy 202.

Program launcher 201 passes proxy 202 to interface manager 204 using communication 215. Communication 215 contains a code example of a method call that can pass proxy 202. Now, program launcher 201 starts a JAVA application 203 via communication 220.

While executing its code, JAVA application 203 encounters the need for interaction with its interface. Therefore, JAVA application 203 requests the instantiation of its interface from interface manager 204 in communication 225. Communication 225 contains a code example of a method call that can request an instantiation of an interface.

Upon receiving communication 225, interface manager 204 instantiates interface instance 205 via communication 230. Interface manager 204 sends communication 235 to hook interface instance 205 to proxy 202. Communication 235 contains a code example of a method call that can bind interface instance 205 to proxy 202.

JAVA application 203 continues to execute its instructions, now that it has established connectivity with interface instance 205. When JAVA application 230 executes a method call for interface instance 205, communication 240 is sent to proxy 202. At this point, proxy 202 can optionally perform data collection or additional processing before sending communication 245 to interface instance 205. Communication 245 essentially relays the method call of JAVA application 203 from proxy 202 to interface instance 205.

Figure 3:
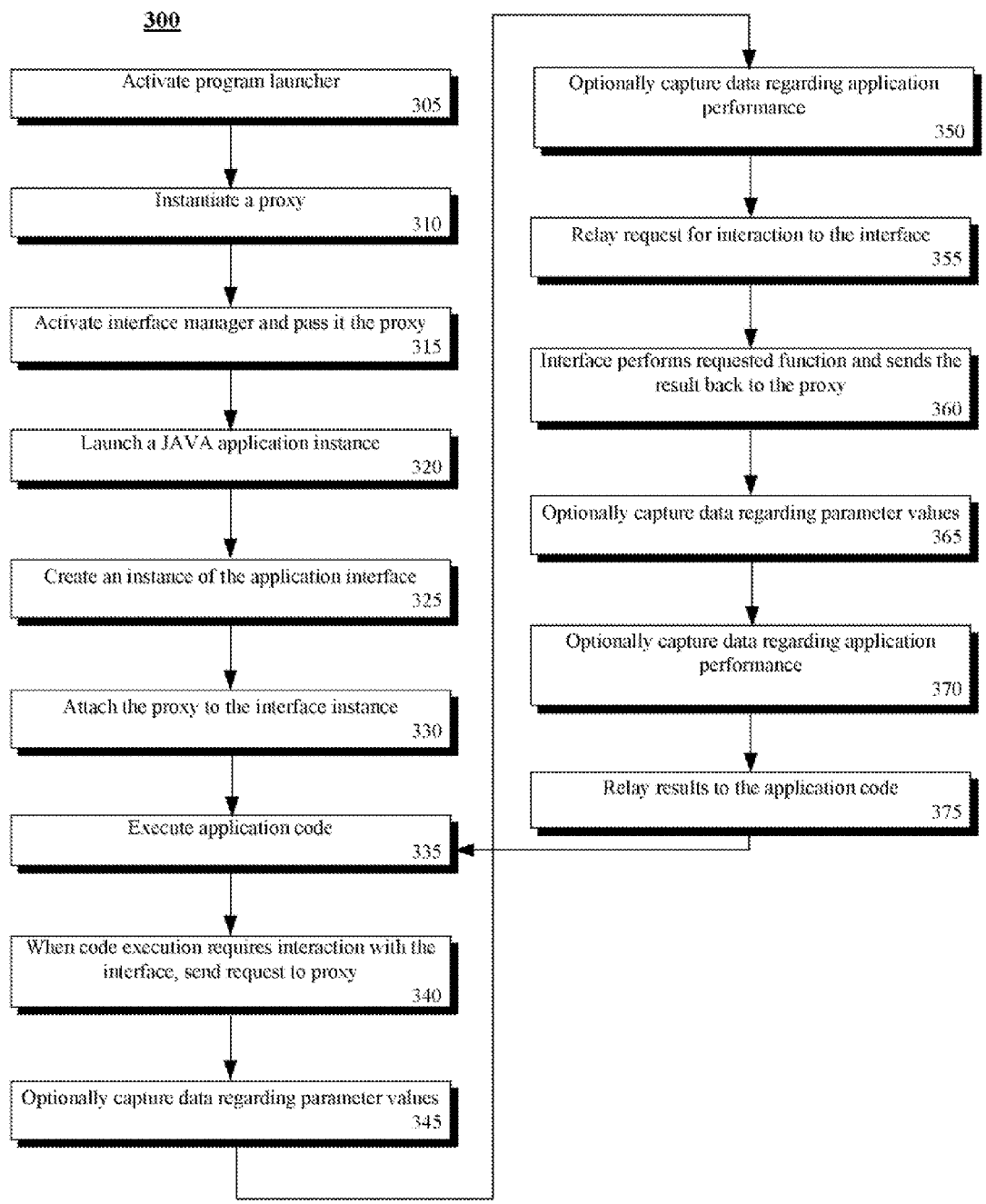
FIG. 3 is a flow chart of a method for inserting a proxy into a JAVA application environment in accordance with an embodiment of the inventive arrangements disclosed herein.

FIG. 3 is a flow chart of a method 300 for inserting a proxy into a JAVA application environment in accordance with an embodiment of the inventive arrangements disclosed herein. Method 300 can be performed in the context of system 100 or in the context of any other system supporting dynamic insertion of proxies into an existing JAVA application.

Method 300 can begin in step 305, where the program launcher is activated. In step 310, the program launcher instantiates a proxy. Next, the program launcher activates the interface manager and passes it the proxy in step 315. The last task of the program manager is step 320 where an instance of the JAVA application is launched.

In step 325, the interface manager creates an instance of the JAVA application interface. Once the interface is instantiated, then interface manager attaches the proxy to the interface instance in step 330. In step 335, the JAVA application begins to execute its code. During the execution of the application code, the application may require some form of interaction with the interface. In this case, step 340 is performed wherein the JAVA application sends a request for interaction with the interface to the proxy.

Step 345 can be optionally executed to capture parameter data values. Likewise, step 350 can be optionally executed to capture performance data for the JAVA application. In step 355, the proxy relays the request of the JAVA application to the interlace instance.

Once the interface finishes the requested interaction, the result is sent back to the proxy in step 360. Like the request from the application to the interface, the proxy can optionally capture parameter data in step 365 and performance data in step 370 in regards to the information being returned to the application.

The proxy then relays the response of the interface instance to the JAVA application in step 375. Control of the process is returned to the application in step 335 to continue executing its code.

Figure 4:
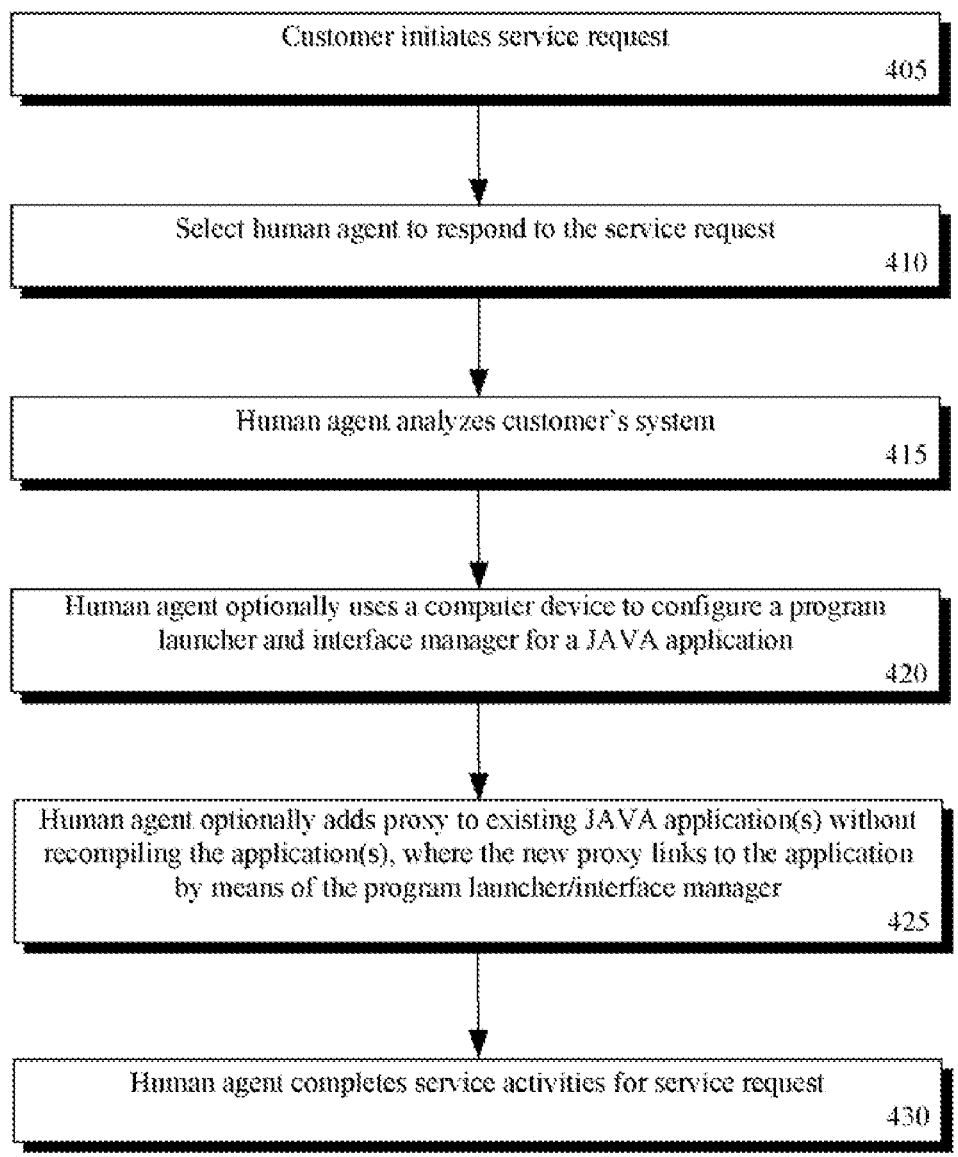
FIG. 4 is a flow chart of a method where a service agent can configure a system for inserting a proxy into a JAVA application environment in accordance with an embodiment of the inventive arrangements disclosed herein.

FIG. 4 is a flow chart of a method 400 where a service agent can configure a system for inserting a proxy into a JAVA application environment in accordance with an embodiment of the inventive arrangements disclosed herein. Method 400 can be preformed in the context of system 100 and/or method 300.

Method 400 can begin in step 405, when a customer initiates a service request. The service request can be a request for a service agent to establish a new system for inserting a proxy into a JAVA application environment. The service request can also be a request to troubleshoot a problem with an existing proxy insertion system or to create a new proxy for another JAVA application.

In step 410, a human agent can be selected to respond to the service request. In step 415, the human agent can analyze a customer's current system and can develop a solution. The solution can result in system 100 or any system where proxies can be dynamically inserted into JAVA applications, such as a system that performs the steps of method 300.

In step 420, the human agent can configure the customer's system to include a program launcher and interface manager for a designated JAVA application. In step 425, the human agent can optionally add a proxy to one or more existing JAVA applications without the need for recompiling the applications, wherein the new proxy is injected into the application by means of the program launcher and interface manager. The human agent can perform steps 420 and 425 and/or can configure a computing device of the customer in a manner that the customer or clients of the customer can perform steps 420 and 425 using the configured system in the future. For example, the service agent can load and configure software and hardware so that client devices will be capable of inserting proxies into JAVA applications. In step 430, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for inserting a proxy into a JAVA application environment comprising:
   identifying a JAVA application that is directly coupled to an interface in source code of the JAVA application;
   instantiating the JAVA application using a program launcher to generate a JAVA application instance, wherein the instantiating of the JAVA application using the program launcher comprises:
      activating the program launcher to instantiate a proxy;
      passing the instantiated proxy to an interface manager;
      starting an instance of a JAVA application; and
      initiating, via the interface manager, an interface instance of the interface;
   wherein said interface manager hooks the instantiated proxy between the interface instance and the JAVA application instance, wherein the proxy represents a layer of code dynamically added at runtime between the JAVA application instance and the interface instance in a manner transparent to the JAVA application instance and to the interface instance, wherein source code of the JAVA application lacks any reference to the proxy.

2. The method of claim 1, further comprising:
   monitoring communications between the interface instance and the JAVA application instance via the instantiated proxy.

3. The method of claim 1, wherein the proxy is implemented as a JAVA Proxy Class.

4. The method of claim 1, wherein the interface instance is a JAVA interface.

5. The method of claim 1, wherein the instantiated proxy captures data regarding a functioning of the JAVA application instance.

6. The method of claim 5, wherein the captured data reflects processing performance.

7. The method of claim 5, wherein the captured data includes a value of parameters passed to the JAVA application instance.

8. The method of claim 5, wherein the proxy processes the captured data and performs at least one programmatic action based upon the captured data.

9. The method of claim 1, wherein the proxy adds additional functionality lacking in the JAVA application, yet does not change execution logic of the JAVA application and does not change data conveyed between the JAVA application and the interface instance in any manner.

10. The method of claim 1, wherein the instantiated proxy captures data directed towards the interface instance from the JAVA application instance, and performs at least one programmatic action based upon the captured data.

11. The method of claim 1, wherein the interface manager manages communications between a plurality of interface instances and plurality of JAVA application instances.

12. The method of claim 1, wherein at least one of the JAVA application instance, the instantiated proxy, and the interface instance is distributed at a remote network location from another one of the JAVA application instance, the instantiated proxy, and the interface instance.

13. The method of claim 1, wherein the program launcher is an alternative launcher to a standard program launcher of the JAVA application environment, wherein when the JAVA application is instantiated using the standard program launcher the JAVA application is instantiated and is able to communicate with the interface instance but the proxy is not instantiated.

14. A computer-readable storage medium having stored thereon, a computer program having a plurality of code sections, said code sections executable by a machine for causing the machine to perform the steps of:
   identifying a JAVA application that is directly coupled to an interface in source code of the JAVA application;
   instantiating the JAVA application using a program launcher to generate a JAVA application instance, wherein the instantiating of the JAVA application using the program launcher comprises:
      activating the program launcher to instantiate a proxy;
      passing the instantiated proxy to an interface manager;
      starting an instance of a JAVA application; and
      initiating, via the interface manager, an interface instance of the interface;
   wherein said interface manager hooks the instantiated proxy between the interface instance and the JAVA application instance, wherein the proxy represents a layer of code dynamically added at runtime between the JAVA application instance and the interface instance in a manner transparent to the JAVA application instance and to the interface instance, wherein source code of the JAVA application lacks any reference to the proxy.

15. The computer-readable storage medium of claim 14, wherein the proxy adds additional functionality lacking in the JAVA application, yet does not change execution logic of the JAVA application and does not change data conveyed between the JAVA application and the interface in any manner.

16. A system for inserting a proxy into a JAVA application environment comprising:
   a computer system comprising hardware and least one computer program product that is stored in a tangible storage medium, said computer system being operable to execute said at least one computer program product, wherein executing said at least one computer program product causes said computer system to:
   identify a JAVA application that is directly coupled to an interface in source code of the JAVA application;
   instantiate the JAVA application using a program launcher to generate a JAVA application instance, wherein the instantiating of the JAVA application using the program launcher comprises;
      activating the program launcher to instantiate a proxy;
      passing the instantiated proxy to an interface manager;
      starting an instance of a JAVA application; and
      initiating, via the interface manager, an interface instance of the interface;
   wherein said interface manager hooks the instantiated proxy between the interface instance and the JAVA application instance, wherein the proxy represents a layer of code dynamically added at runtime between the JAVA application instance and the interface instance in a manner transparent to the JAVA application instance and to the interface instance, wherein source code of the JAVA application lacks any reference to the proxy.

17. The system of claim 16, wherein the proxy adds additional functionality lacking in the JAVA application, yet does not change execution logic of the JAVA application and does not change data conveyed between the JAVA application and the interface instance in any manner.

18. The system of claim 16, wherein the proxy represents a layer of code dynamically added at runtime between an instance of the JAVA application and the interface instance in a manner transparent to the JAVA application instance and the interface instance, wherein source code of the JAVA application lacks any reference to the proxy.

19. The system of claim 16, wherein the proxy and the JAVA application interoperate even though no explicit hook in the JAVA application links to the proxy.

20. The system of claim 16, wherein the proxy is implemented as a JAVA Proxy Class.

* * * * *